(12) United States Patent
Kanzaki et al.

(10) Patent No.: US 11,787,198 B2
(45) Date of Patent: Oct. 17, 2023

(54) PRINTING APPARATUS HAVING A HEAD CONFIGURED TO SEPARATELY EJECT A FIRST TYPE OF LIQUID TO FORM A BACKGROUND AND A SECOND TYPE OF LIQUID TO FORM AN IMAGE

(71) Applicant: Brother Kogyo Kabushiki Kaisha, Nagoya (JP)

(72) Inventors: Takashi Kanzaki, Nagoya (JP); Shuhei Suzuki, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/651,909

(22) Filed: Feb. 22, 2022

(65) Prior Publication Data

US 2022/0266602 A1  Aug. 25, 2022

(30) Foreign Application Priority Data

Feb. 24, 2021 (JP) .................................. 2021-027095

(51) Int. Cl.
*B41J 2/21* (2006.01)
*B41J 11/00* (2006.01)

(52) U.S. Cl.
CPC ......... *B41J 2/2121* (2013.01); *B41J 11/0021* (2021.01)

(58) Field of Classification Search
CPC .... B41J 2/2121; B41J 11/0021; B41J 2/2128; B41J 11/00214; B41J 2/2117; B41J 11/00216; G06K 15/023
See application file for complete search history.

(56) References Cited

U.S. PATENT DOCUMENTS 8,888,270 B2 * 11/2014 Kachi ................ B41J 11/00214
347/102
2011/0102488 A1 5/2011 Usuda et al.

FOREIGN PATENT DOCUMENTS

| JP | 2005-153314 A | 6/2005 |
| JP | 2011-116103 A | 6/2011 |
| JP | 2012-016923 A | 1/2012 |

\* cited by examiner

*Primary Examiner* — Bradley W Thies
(74) *Attorney, Agent, or Firm* — BURR PATENT LAW, PLLC

(57) ABSTRACT

In a printing apparatus, in a first mode a head ejects a first type of liquid onto a printing medium and an energy applying device applies energy to the first type of liquid to form a background, and subsequently the head ejects a second type of liquid onto the background and the energy applying device applies energy to the second type of liquid on the background so that an image is formed on the background. In a second mode the head ejects the second type of liquid onto the printing medium without forming a background, and the energy applying device applies energy to the second type of liquid. The controller performs setting a quantity of the second type of liquid to be used in the first mode, to be greater than a quantity of the second type of liquid to be used in the second mode.

9 Claims, 13 Drawing Sheets

FIG. 4
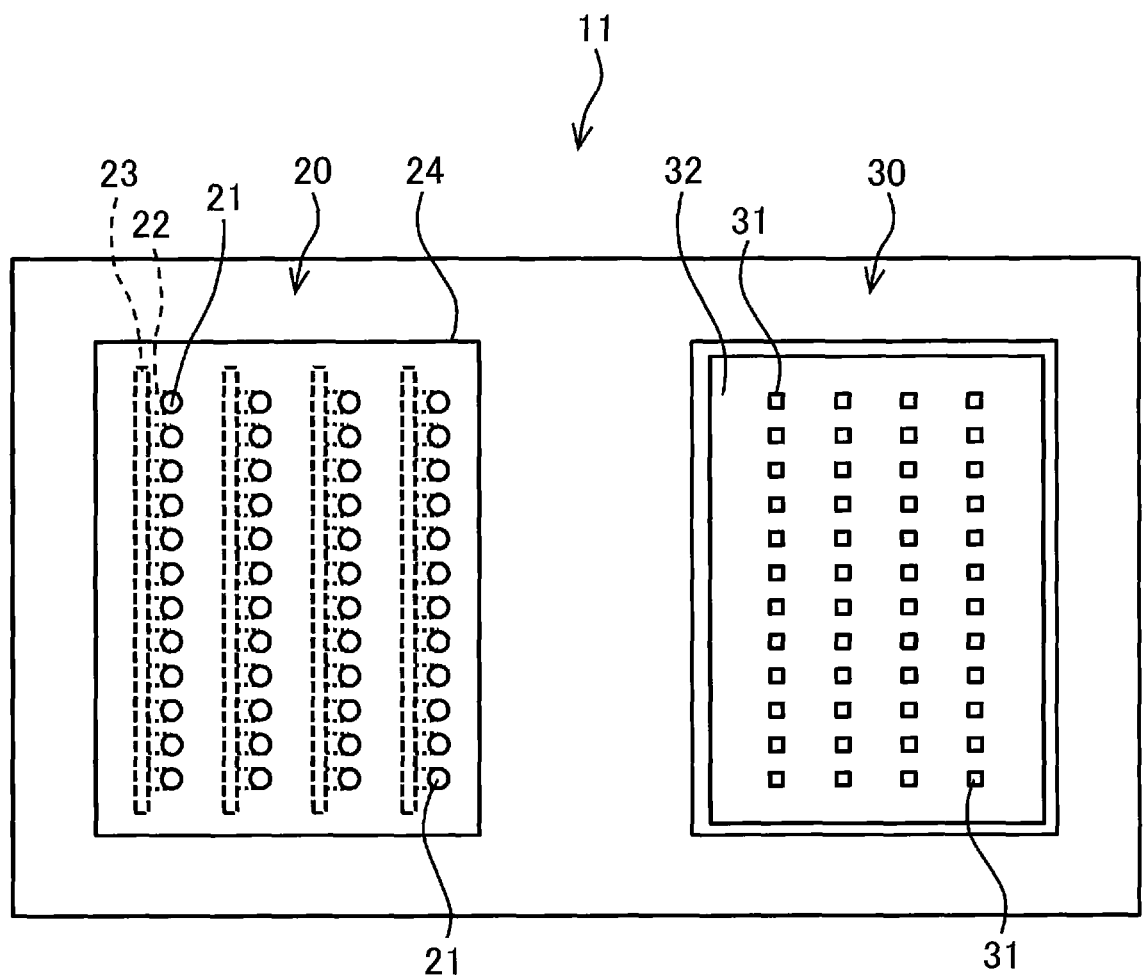
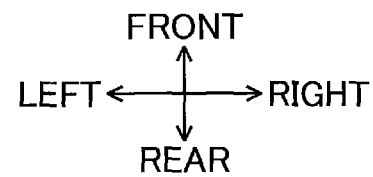

PRINTING APPARATUS HAVING A HEAD CONFIGURED TO SEPARATELY EJECT A FIRST TYPE OF LIQUID TO FORM A BACKGROUND AND A SECOND TYPE OF LIQUID TO FORM AN IMAGE

CROSS REFERENCE TO RELATED APPLICATION

This application claims priority from Japanese Patent Application No. 2021-027095 filed Feb. 24, 2021. The entire content of the priority application is incorporated herein by reference.

BACKGROUND

A conventional image recording apparatus, which is one example of a printing apparatus, is provided with a recording head for ejecting ink onto a recording medium, and a light irradiation device for irradiating light onto the ink that has impacted the recording medium. This image recording apparatus records images on a recording medium by ejecting both basic color inks and white ink onto the recording medium from the recording head and irradiating light onto the ink on the recording medium.

SUMMARY

When recording an image on a transparent recording medium, for example, the image recording apparatus described above ejects white ink for all pixels in an image-recording area of the recording medium or for those pixels not being recorded with the basic color inks in order to make the image represented by the various basic color inks stand out distinctly. Here, the ejection quantity of the basic inks is less in areas having a large ejection quantity of white ink than areas in which white ink is not ejected, in order to produce a uniform ink quantity in all areas of the recording medium in which an image is recorded. As a consequence, color irregularities or banding from the basic color inks may occur, degrading the image quality.

In view of the foregoing, it is an object of the present disclosure to provide a printing apparatus capable of suppressing a drop in image quality in areas printed with overlapping colors.

In order to attain the above and other objects, the disclosure provides a printing apparatus. The printing apparatus includes a head, an energy applying device, and a controller. The head is configured to separately eject a first type of liquid and a second type of liquid toward a printing medium. The energy applying device is configured to cure the first type of liquid and the second type of liquid on the printing medium. The controller is configured to set a print mode to a first mode or a second mode. In the first mode the head ejects the first type of liquid onto the printing medium and the energy applying device applies energy to the first type of liquid on the printing medium so that the first type of liquid is cured and fixed on the printing medium to form a background, and subsequently the head ejects the second type of liquid onto the background and the energy applying device applies energy to the second type of liquid on the background so that the second type of liquid is cured and fixed on the background and an image is formed on the background. In the second mode the head ejects the second type of liquid onto the printing medium without forming a background on the printing medium, and the energy applying device applies energy to the second type of liquid on the printing medium so that the first type of liquid is cured and fixed on the printing medium and an image is formed on the printing medium. The controller is further configured to perform setting a quantity of the second type of liquid, which is to be used when an image is formed in the first mode, to be greater than a quantity of the second type of liquid to be used when the same image is formed in the second mode.

BRIEF DESCRIPTION OF THE DRAWINGS

The particular features and advantages of the disclosure as well as other objects will become apparent from the following description taken in connection with the accompanying drawings, in which:

FIG. 4 is a bottom view of the head unit shown in FIG. 3;

DETAILED DESCRIPTION

Figure 1:
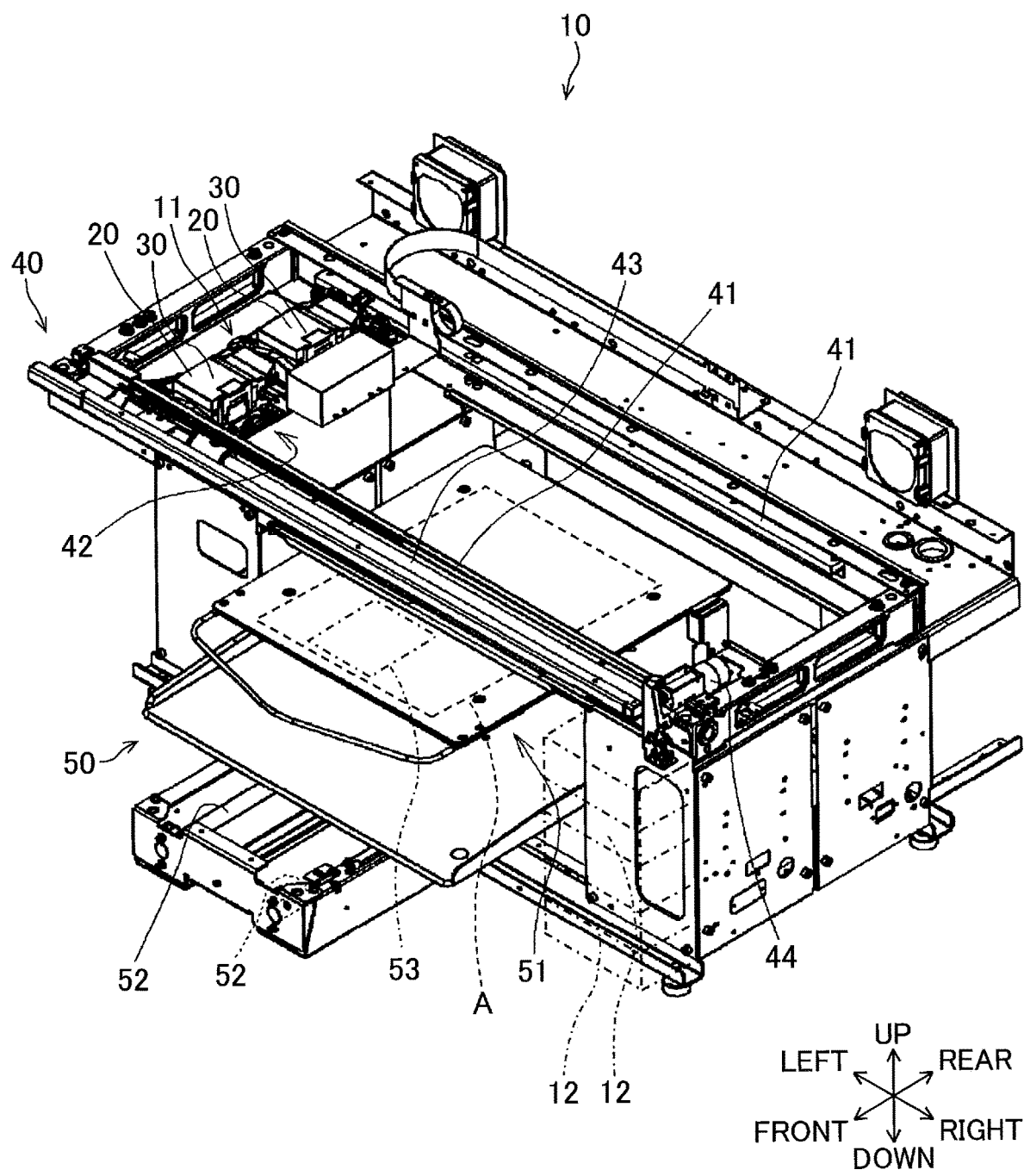
FIG. 1 is a perspective view illustrating a printing apparatus whose cover is open, wherein the printing apparatus includes light sources irradiating lights in a state that a cover is open.

Embodiments of the present disclosure will be described while referring to drawings. In all the drawings, like parts and components are designated with the same reference numerals to avoid duplicating description.

First Embodiment

Structure of a Printing Apparatus

FIG. 1 shows a printing apparatus 10 according to a first embodiment. In the example of FIG. 1, the printing apparatus 10 is an inkjet printer that prints by ejecting liquid from a head 20 onto a printing medium A and applies energy to the liquid on the printing medium A with an energy applying device 30. The printing medium A has one of a sheet-like form, such as fabric, paper, and the like; and a three-dimensional form, such as a bowl or mug. The printing medium A is formed of a material such as resin through which liquid does not permeate or permeates less easily than or equal to liquid permeates through paper.

Figure 2:
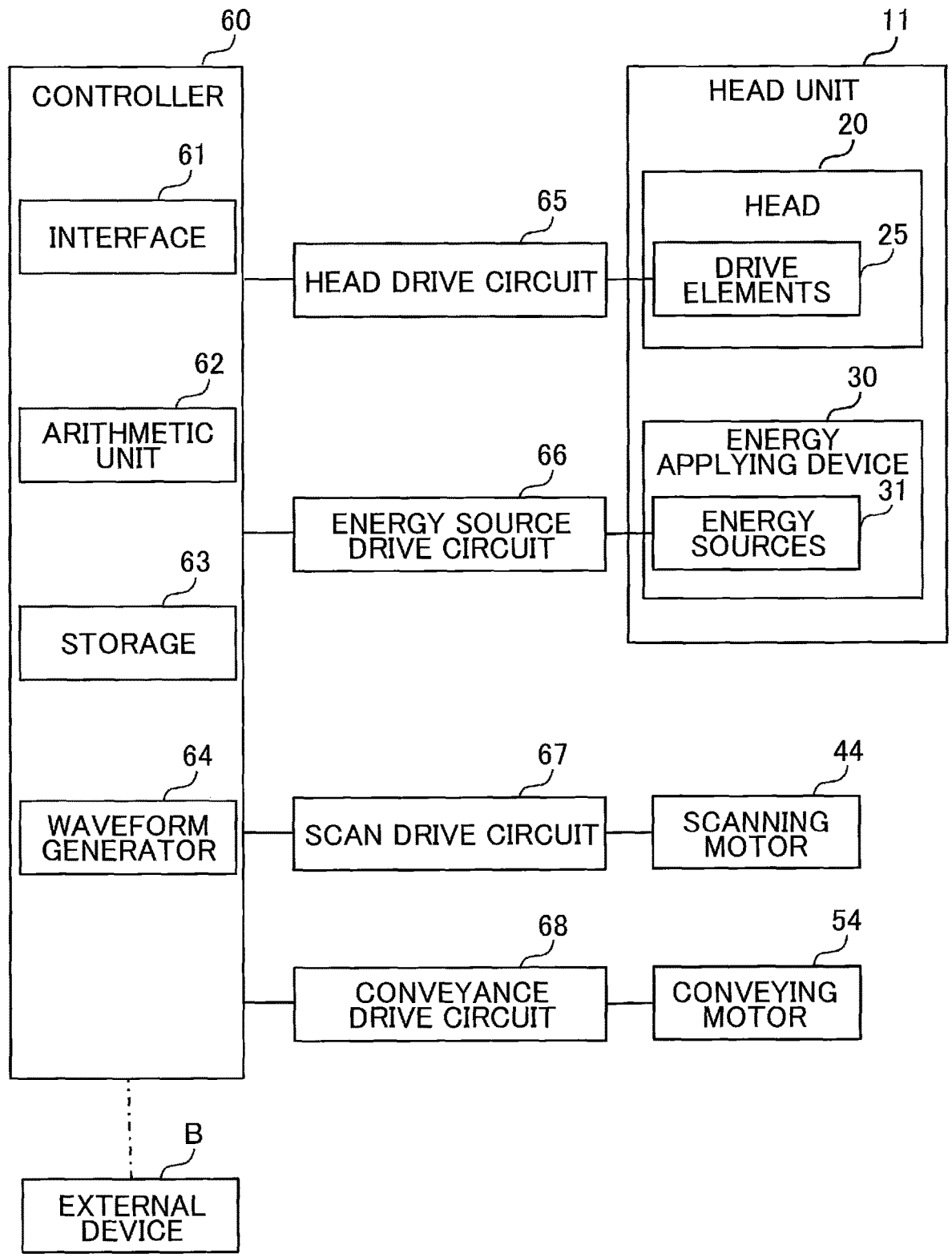
FIG. 2 is a block diagram illustrating functional blocks of configurations in the printing apparatus.

The printing apparatus 10 is provided with a head unit 11, a scanning device 40, a conveying device 50, a plurality of tanks 12, and a controller 60 (see FIG. 2). The head unit 11 has the head 20 for ejecting a first type of liquid and a second type of liquid onto the printing medium A, and the energy applying device 30 that apply energy for curing the first type of liquid and second type of liquid on the printing medium A. The head unit 11 and the controller 60 will be described later in greater detail.

The direction in which the conveying device 50 conveys the printing medium A will be called the front-rear direction. A scanning direction in which the scanning device 40 moves the head unit 11 will be called the left-right direction. The scanning direction intersects (is orthogonal to, for example) the conveying direction. A direction intersecting (orthogonal to, for example) both the front-rear direction and left-right direction will be called the up-down direction. However, the layout of the printing apparatus 10 is not limited to these directions.

The scanning device 40 moves the head unit 11 in the left-right direction. The scanning device 40 has a pair of scanning rails 41, a carriage 42, a drive belt 43, and a scanning motor 44. The scanning rails 41 are elongated members extending in the left-right direction. The scanning rails 41 are arranged parallel to each other with the head unit 11 interposed therebetween in the front-rear direction. The carriage 42 supports the head unit 11 and is itself supported so as to be movable along the scanning rails 41 in the left-right directions. The drive belt 43 is hung along one of the scanning rails 41 and coupled to the scanning motor 44. That is, the drive belt 43 is mounted over the scanning rail 41 to extend in the left-right direction. Further, the drive belt 43 is connected to the carriage 42. By driving the drive belt 43, the scanning motor 44 reciprocates the carriage 42 along the scanning rails 41 in the left-right direction.

The conveying device 50 moves the printing medium A in the front-rear direction. The conveying device 50 has a stage 51, a pair of conveying rails 52, a stage support 53, and a conveying motor 54 (see FIG. 2). The stage 51 has a rectangular plate shape. The printing medium A is supported on the top surface of the stage 51. Thus, the stage 51 defines the vertical clearance between the printing medium A and the head 20. The conveying rails 52 extend in the front-rear direction and support the stage support 53 so that the stage support 53 is movable in the front-rear direction. The stage support 53 detachably supports the stage 51, for example, and is coupled to the conveying motor 54. The conveying motor 54 drives the stage support 53 to move the stage 51 in the front-rear direction.

The tanks 12 are containers that accommodate liquid. The tanks 12 are connected to the head 20 and supply liquid thereto. The liquid is an energy-curable liquid that is cured by an applied energy. The printing apparatus 10 is provided with five tanks 12. The tanks 12 respectively accommodating two types of achromatic inks and three types of chromatic inks. The achromatic inks are white (W) and black (K), while the chromatic inks are yellow (Y), magenta (M), and cyan (C).

Structure of the Head Unit

Figure 3:
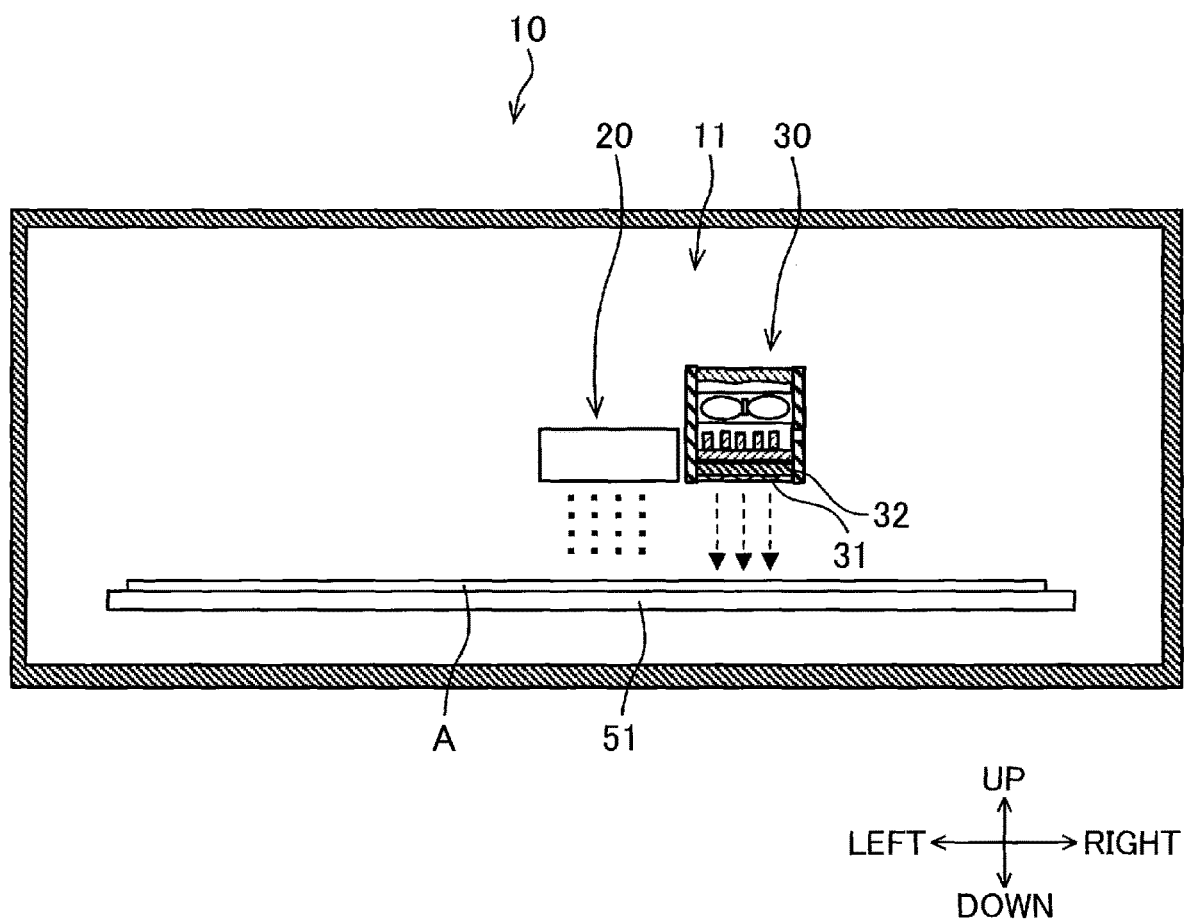
FIG. 3 is a side view of a head unit provided in the printing apparatus.

As shown in FIGS. 3 and 4, the head unit 11 is provided with the head 20 and the energy applying device 30. The head unit 11 is disposed above the stage 51 and spaced apart from the same. The bottom surfaces of the head 20 and the energy applying device 30 oppose the top surface of the stage 51. The head 20 ejects liquid toward the printing medium A. The head 20 has a plurality of nozzles 21, a plurality of individual channels 22, a plurality of common channels 23, a channel-forming body 24, and a plurality of drive elements 25 (see FIG. 2). The channel-forming body 24 has a rectangular parallelepiped shape, for example. The nozzles 21, the individual channels 22, and the common channels 23 are formed inside the channel-forming body 24. The nozzles 21 are openings formed in the bottom surface of the channel-forming body 24.

One common channel 23 is provided for each of the five tanks 12 (see FIG. 1). Each common channel 23 is connected to the corresponding tank 12 and receives liquid supplied from the same. Each common channel 23 extends in the front-rear direction, and a plurality of individual channels 22 branch off from the common channel 23. The upstream end of each individual channel 22 is connected to the corresponding common channel 23, while the downstream end is connected to the corresponding nozzle 21.

Pluralities of the nozzles 21 forming nozzle rows are aligned in the front-rear direction at regular intervals. Liquid enters the common channel 23 from the corresponding tank 12, flows through the common channel 23, and is distributed to the individual channels 22. Liquid flowing into the individual channels 22 is supplied to the corresponding nozzles 21.

The drive elements 25 are provided in correspondence with the individual channels 22. The drive elements 25 are piezoelectric elements or the like that are driven to modify the volume of the corresponding individual channels 22 in response to drive signals received from the controller 60. When driven, these drive elements 25 apply pressure to liquid in the corresponding individual channels 22, causing liquid to be ejected from the nozzles 21 connected to those individual channels 22.

The energy applying device 30 moves together with the head 20. The energy applying device 30 is disposed on the upstream side of the head 20 in the direction the head 20 moves for ejecting liquid. In unidirectional printing, for example, the head 20 ejects liquid while moving leftward, but does not eject liquid while moving rightward. In this case, the energy applying device 30 is disposed on the right side of the head 20, i.e., the upstream side of the head 20 in the moving direction when the head 20 moves leftward while printing. As the head 20 ejects liquid onto the printing medium A, the energy applying device 30 following the head 20 applies energy to the liquid on the printing medium A.

The energy applying device 30 has a plurality of energy sources 31, and a substrate 32 that supports the energy sources 31. The energy applying device 30 applies energy for curing liquid on the printing medium A. The substrate 32 has a flat plate shape. An electric circuit is provided on the bottom surface of the substrate 32. The electric circuit is connected to the energy sources 31 and the controller 60 (see FIG. 2). The energy sources 31 are LEDs or other light sources that irradiate one of ultraviolet light, infrared light, and other light.

Structure of the Control Device

As shown in FIG. 2, the controller 60 has an interface 61, an arithmetic unit 62, a storage 63, and a waveform generator 64. The controller 60 may be a standalone device that performs centralized control or a plurality of devices that performs decentralized control.

The interface 61 is connected to an external device B, such as a computer and a network. The controller 60 receives various data, such as print data, from the external device B via the interface 61. Print data includes image data, such as raster data, representing an image to be printed on the printing medium A. The print data may be stored in the storage 63 in advance.

The storage 63 is memory accessible to the arithmetic unit 62 and may be configured of RAM, ROM, and the like. The RAM temporarily stores various data. Examples of data stored in RAM are print data and print data converted by the arithmetic unit 62. The ROM stores programs for performing various data processes. The programs may be acquired from the external device B or may be stored in another storage medium.

The arithmetic unit 62 is configured of a processor, such as a CPU; and an integrated circuit, such as an ASIC, for example. By executing programs stored in ROM, the arithmetic unit 62 controls the drive elements 25, the energy sources 31, the scanning motor 44, and the conveying motor 54 to execute printing processes. The printing process will be described later in greater detail.

The waveform generator 64 generates a waveform signal defining the waveforms of drive signals to be outputted to the drive elements 25. The waveform generator 64 may be a dedicated circuit or may be configured by the arithmetic unit 62 and the storage 63. The waveform signals are pulse signals, for example, that drive the drive elements 25 to eject liquid from the head 20. There are various types of waveform signals for ejecting different quantities of liquid.

The arithmetic unit 62 generates waveform selection data by selecting one waveform signal from among the plurality of types of waveform signals for each nozzle 21 and each drive cycle of the drive element 25 corresponding to the nozzle 21. The arithmetic unit 62 selects a waveform signal that conforms to the ejection quantity of liquid specified in the print data for each droplet. When generating waveform selection data, the arithmetic unit 62 selects ejection waveform signals having higher ejection quantities of ink for higher densities specified in the print data for the image being printed.

The controller 60 is connected to the drive elements 25 via a head drive circuit 65. The controller 60 outputs the waveform signals and the waveform selection data to the head drive circuit 65 as control data. The head drive circuit 65 generates drive signals corresponding to the waveform signals selected according to the waveform selection data and outputs these drive signals to the drive elements 25. The drive elements 25 are driven based on the drive signals corresponding to the ejection waveform signals. When a drive element 25 is driven, the volume of the corresponding individual channel 22 is modified, applying pressure to the liquid in the individual channel 22 that ejects liquid from the corresponding nozzle 21.

The controller 60 is connected to the energy sources 31 via an energy source drive circuit 66. The controller 60 outputs control data for the energy sources 31 to the energy source drive circuit 66 based on the print data. In this way, the controller 60 controls when the energy sources 31 are switched on and off.

The controller 60 is also connected to the scanning motor 44 via a scan drive circuit 67. The controller 60 outputs control data for the scanning motor 44 to the scan drive circuit 67 based on the print data. The controller 60 is also connected to the conveying motor 54 via a conveyance drive circuit 68. The controller 60 outputs control data for the conveying motor 54 to the conveyance drive circuit 68 based on the print data. Through this process, the controller 60 controls the drive timing, the rotational speed, the rotation amount, and the like for the scanning motor 44 and the conveying motor 54.

Printing Process

In a printing process, the controller 60 executes ejection operations, energy application operations, scan operations, and conveyance operations. The controller 60 executes an ejection operation by controlling the drive elements 25 to eject liquid from the head 20. The controller 60 executes an energy application operation by controlling the energy sources 31 to apply energy therefrom. The controller 60 executes a scan operation by controlling the scanning motor 44 to move the head unit 11 in the left-right direction. The controller 60 executes a conveyance operation by controlling the conveying motor 54 to convey the printing medium A forward.

The ejection operation, the energy application operation, and the scan operations are performed during a pass. In one pass, liquid is ejected from the nozzles 21 while the head 20 moves leftward. Through this process, the liquid from nozzles 21 impacts the printing medium A opposing the bottom surface of the head 20. The ejected liquid forms a plurality of dots aligned in the left-right direction on the printing medium A. The energy sources 31 apply energy while the energy applying device 30 moves leftward behind the head 20. The energy applied to the printing medium A opposing the energy sources 31 cures the liquid on the printing medium A and fixes the liquid to the printing medium A.

After completing a pass, the controller 60 performs a conveyance operation to move the printing medium A forward relative to the head 20. After the conveyance operation, the controller 60 performs another pass to form another plurality of dots juxtaposed with the previous plurality of dots in the front-rear direction. By repeatedly alternating between a pass and a conveyance operation in this way, the controller 60 carries out the printing of an image on the printing medium A having pluralities of dots juxtaposed in both the left-right and front-rear directions.

Print Modes

The printing process has a first mode and a second mode corresponding to whether or not a background is to be formed. In the first mode, the controller 60 forms a background with a first type of liquid on the printing medium A by ejecting the first type of liquid and applying energy thereto, and subsequently prints an image on top of the background by ejecting a second type of liquid and applying energy thereto. In the second mode, the controller 60 does not form a background but simply prints the image directly on the printing medium A by ejecting the second type of liquid and applying energy thereto. The controller 60 uses larger ejection quantities of the second type of liquid when printing an image (printing an image based on image data)

in the first mode than when printing the same image (printing an image based on the same image data) in the second mode.

As described above, the printing apparatus 10 in the present embodiment has two types of liquid, the first type of liquid and the second type of liquid. The first type of liquid is used for forming the background, and the second type of liquid is used for forming an image on the background. The first type of liquid may be set by the user based on the color of the image. For example, the first type of liquid has a color that differs from the color used in the image or a color that differs from the color used most in the image or a color that differs from the color used as the outline of the image. As an example, the first type of liquid is white ink. The second type of liquid is set based on the image data and includes colors used for forming the image. For example, the second type of liquid includes black ink and chromatic inks. The second type of liquid may include or not include white ink.

The printing apparatus 10 may switch modes between the first mode and the second mode in response to a user operation. In this case, the printing apparatus 10 is provided with an input device and the user operates the input device to input mode data, for example. With this configuration, the controller 60 determines whether the mode is to be the first mode or the second mode based on the mode data and executes a printing process according to the determined mode. Alternatively, the mode may be switched based on the print data. In this case, the print data includes mode data specifying either the first mode or the second mode in addition to the image data.

Second Mode

In the second mode, the controller 60 divides the image to be printed based on the image data into a matrix of pixels and acquires pixel data for each pixel. Here, each pixel indicates a region in the image. The pixel data has RGB values, for example, specifying the density for each color of the pixel. The RGB values represent one of 256 gradations for each of the colors red (R), green (G), and blue (B), where a gradation represents the degree of lightness or darkness.

The controller 60 performs a color conversion process to convert colors expressed in the image to colors of liquid provided in the printing apparatus 10. That is, the controller 60 converts the colors in pixel data to colors in drawing data based on prescribed correlations. These prescribed correlations are pre-stored in the storage 63 as a conversion table specifying correlations between colors of pixel data and colors of drawing data. As an example, the colors in pixel data are the three RGB colors, and the colors in drawing data are the five CMYKW colors of liquid provided in the printing apparatus 10.

The controller 60 performs a halftone process to convert gradations expressed in the image to gradations that can be formed by the printing apparatus 10. That is, the controller 60 converts gradations in the pixel data to gradations in the drawing data based on prescribed correlations. These correlations are pre-stored in the storage 63 as a conversion table specifying correlations between gradations in pixel data and gradations in drawing data.

The gradations in drawing data are set according to the presence or absence of dots to be formed by liquid ejected from the nozzles 21, for example. In this case, each gradation is data specifying one of two levels: "no dot" in which liquid is not ejected, and "dot" in which a prescribed quantity of liquid is ejected. Through this halftone process, the controller 60 converts pixel data specifying values within a range of 256 gradations to drawing data specifying one of the two gradations "dot" and "no dot." Accordingly, the halftone process produces drawing data for the image (image drawing data).

The controller 60 performs a rasterization process to rearrange values in the drawing data for an image which are arranged in a matrix so that values are rearranged in the ejection order of liquid (or the dot formation order) from nozzles 21 during the ejection operation. According to the rearrangement process, a value in drawing data is assigned to each nozzle 21 for each drive cycle of the drive elements 25 for the nozzles 21. The controller 60 generates a waveform signal and waveform selection data for each nozzle 21 and each drive cycle based on the drawing data for the image and outputs the waveform signals and waveform selection data as control data to the head drive circuit 65 for driving the drive elements 25. The colors of drawing data for an image are correlated with nozzles 21 in advance, and gradations of drawing data are correlated with waveform selection data in advance.

Figure 5A:
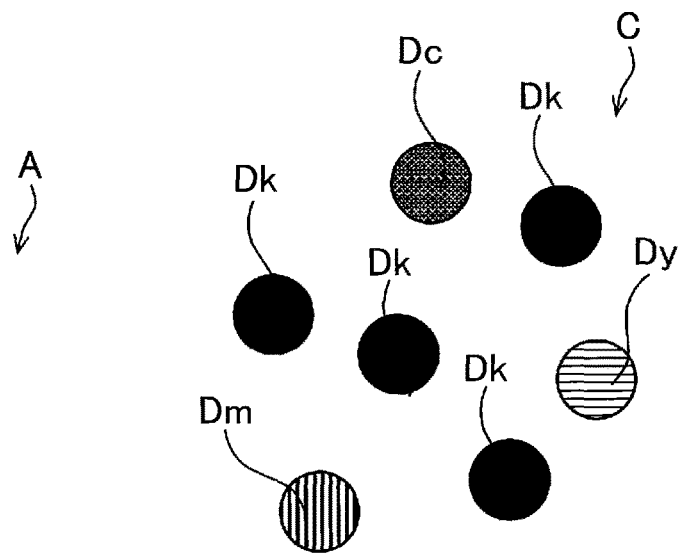
FIG. 5A is an explanatory diagram illustrating dots formed in a second mode.
Figure 5B:
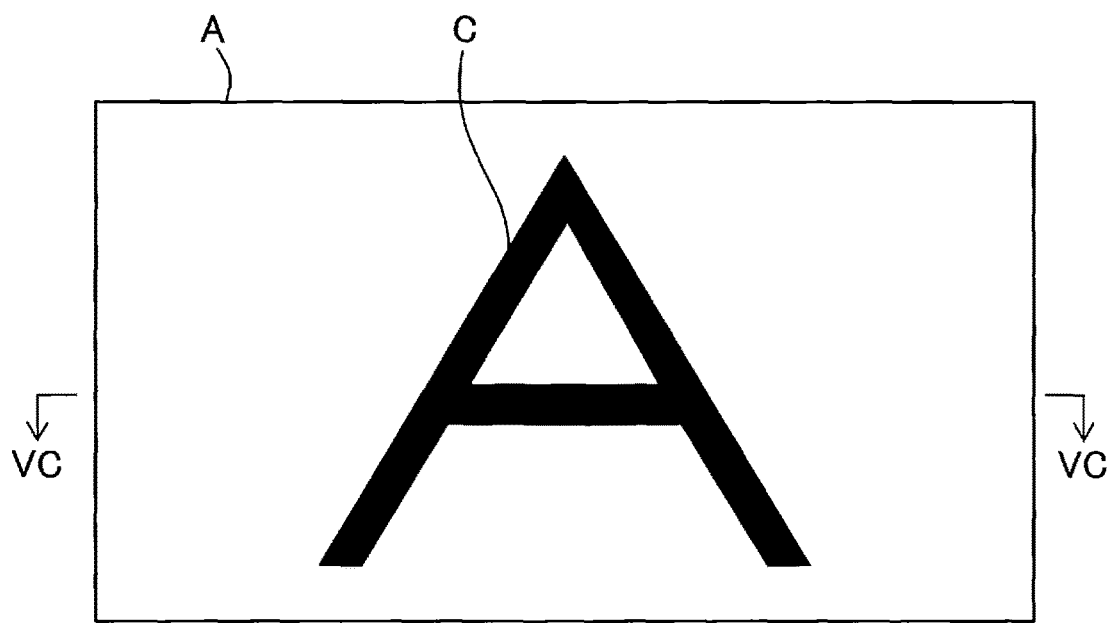
FIG. 5B is an explanatory diagram illustrating a printing medium on which an image is formed in the second mode.
Figure 5C:
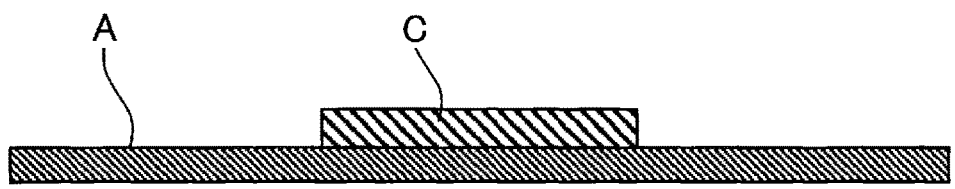
FIG. 5C is a cross section of the printing medium taken along a VC-VC line shown in FIG. 5B.

Through this process, the second type of liquid for colors corresponding to the colors of the image is ejected from the head 20 in the second mode, as illustrated in FIG. 5A. For example, dots formed with the second type of liquid on the printing medium A include dots Dk formed with black ink, dots Dy formed with yellow ink, dots Dm formed with magenta ink, and dots Dc formed with cyan ink. Subsequently, energy is applied to the second type of liquid on the printing medium A through light emitted from the energy applying device 30, thereby fixing the dots to the printing medium A. By repeatedly performing these operations, an image C configured of a plurality of dots is directly printed on the printing medium A, as illustrated in FIGS. 5B and 5C.

First Mode

In the first mode, the controller 60 acquires a background area. This background area may be a prescribed area or may be set according to the size of the printing medium A or the size of the image. For example, the background area may be set so as to cover the entire printing medium A such that the outer edge of the background is aligned with the outer edge of the printing medium A. Alternatively, the background area may be set so as to cover a portion of the printing medium A with the outer edge of the background positioned a prescribed distance inside the outer edge of the printing medium A. Alternatively, the background area may be set with its outer edge positioned a prescribed distance outside the outer edge of the image area so that the image is arranged on the background, where the image area is the area whose pixel data has gradations greater than or equal to a prescribed gradation.

The controller 60 generates drawing data for the background (background drawing data) by setting the color of the background to the color of the first type of liquid, setting gradations for the background area within the printable area to "dots," and setting gradations for the area outside the background area to "no dots." The controller 60 performs a rasterization process on this drawing data for the background to generate control data, divides the control data for the background into sets of data for passes, and outputs a set of data for each pass to the head drive circuit 65.

As in the second mode, the controller 60 also acquires pixel data for a plurality of pixels based on the image data in the print data and performs the color conversion process and the halftone process on the pixel data to generate drawing data for an image to be printed. The controller 60 performs a correction process on the drawing data so that the ejection quantities of second type of liquid are greater when printing an image (printing an image based on image data)

in the first mode than when printing the same image (printing an image based on the same image data) in the second mode. For example, in the correction process, the controller 60 sets the ejection quantities of chromatic inks when printing an image (printing an image based on image data) in the first mode larger than the ejection quantities of chromatic ink for printing the same image (printing an image based on the same image data) in the second mode.

Specifically, black color can be produced by an even blend of chromatic colors. Using this process to produce black the controller 60 replaces some or all of the black dots with three chromatic dots based on prescribed correlations in the correction process. These prescribed correlations are pre-stored in the storage 63 as a conversion table specifying correlations between gradations for black and gradations for chromatic colors. Here, the arrangement of the three C, Y, and M chromatic dots replacing a single black dot is corrected so that the dots are dispersed or overlapped in order to appear black.

Figure 6A:
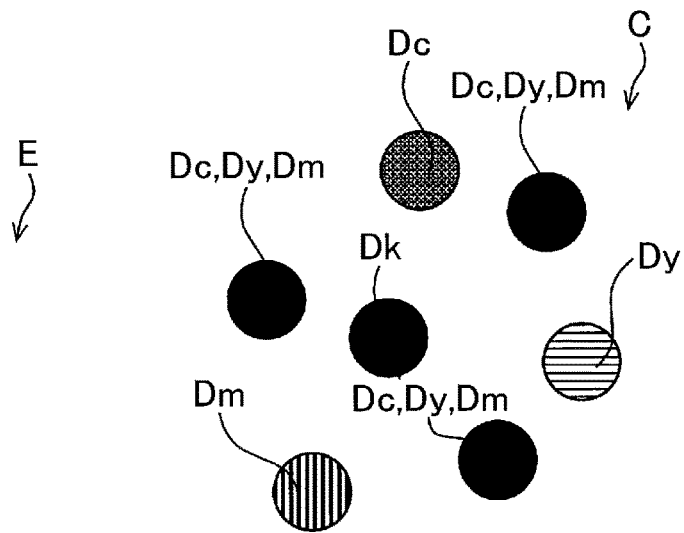
FIG. 6A is an explanatory diagram illustrating dots formed in a first mode.

Through this process, the black dots Dk formed with black ink as shown in FIG. 5A are replaced with chromatic dots Dc, Dy, and Dm formed with the three C, Y, and M chromatic inks as shown in FIG. 6A. The total quantity of the chromatic ink used for forming the chromatic dots Dc, Dy, and Dm in place of the single black dot Dk is greater than the quantity of black ink used for forming the single black dot Dk. Consequently, the ejection quantity of the second type of liquid used for forming an image in the first mode is greater than the ejection quantity of second type of liquid for forming an image in the second mode.

Next, the controller 60 performs a rasterization process on the corrected drawing data for the image, generates control data for the image, divides the control data into sets of data for passes, and outputs a set of data for each pass to the head drive circuit 65. Passes performed for a printing process in the first mode include a pass for the background (a background pass) and a pass for the image (an image pass). Accordingly, the controller 60 does not perform a conveyance operation in the printing process immediately after completing a pass for the background according to the background control data, but performs a pass for the image according to the image control data in addition to performing a pass for the background and subsequently performs the conveyance operation.

Figure 6B:
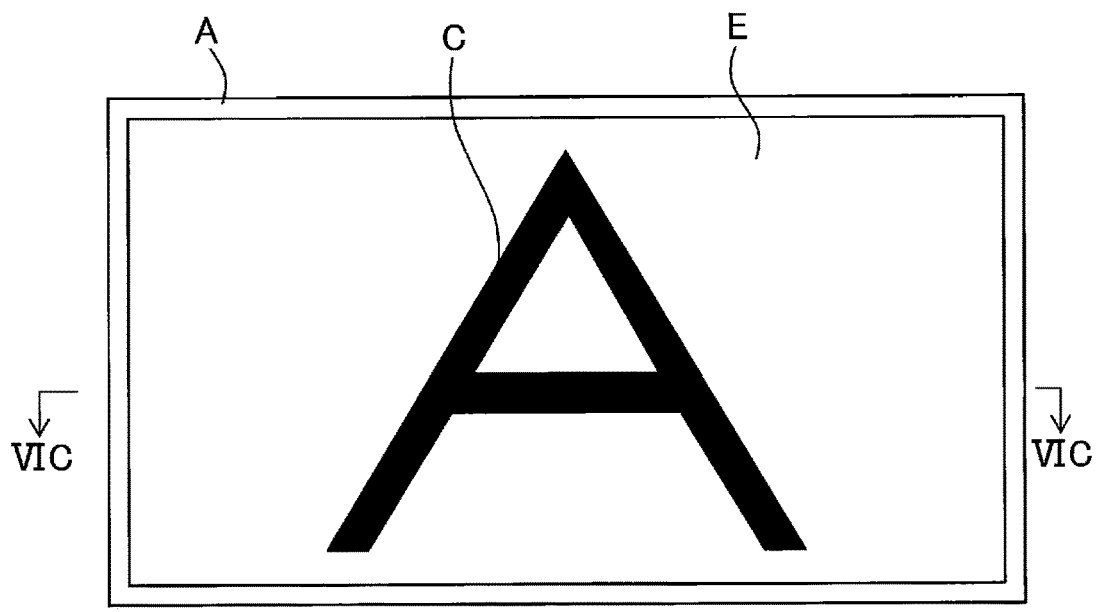
FIG. 6B is an explanatory diagram illustrating a printing medium on which an image is formed in the first mode.
Figure 6C:
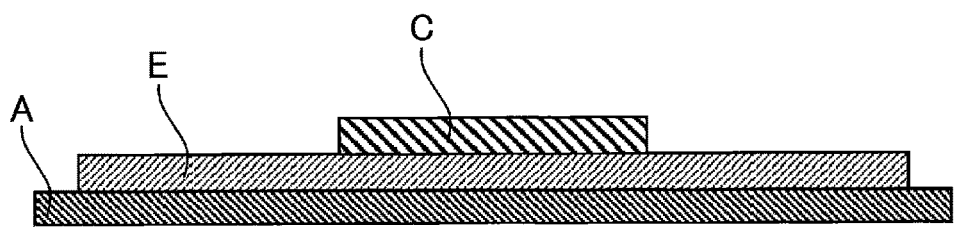
FIG. 6C is a cross section of the printing medium taken along a VIC-VIC line shown in FIG. 6B.

Specifically, while the head 20 moves leftward in a background pass, the first type of liquid is ejected from the head 20 based on the background control data, thereby forming dots on the printing medium A with the first type of liquid, as illustrated in FIGS. 6B and 6C. The energy applying device 30 following this head 20 applies energy to the first type of liquid on the printing medium A as the energy applying device 30 moves leftward, thereby fixing the dots formed with the first type of liquid to the printing medium A. Through this process, a background E configured of a plurality of dots is printed directly on the printing medium A.

After completing the background pass, the controller 60 does not convey the printing medium A forward, but moves the head 20 and the energy applying device 30 rightward to begin an image pass. While the head 20 is moved leftward in this image pass, the second type of liquid is ejected from the head 20 based on control data for the image, thereby forming dots on the background E with the second type of liquid. While moving leftward behind the head 20, the energy applying device 30 applies energy to the second type of liquid on the background E, thereby fixing the dots formed with the second type of liquid to the background. Through this process, an image C configured of a plurality of dots is printed on the background E.

After completing a background pass and an image pass for the current pass, the printing medium A is conveyed forward, and the next pass is executed. The entire image C is printed by repeatedly alternating among a background pass, an image pass, and a conveyance operation in this way.

Control Method of the Printing Apparatus

Figure 7:
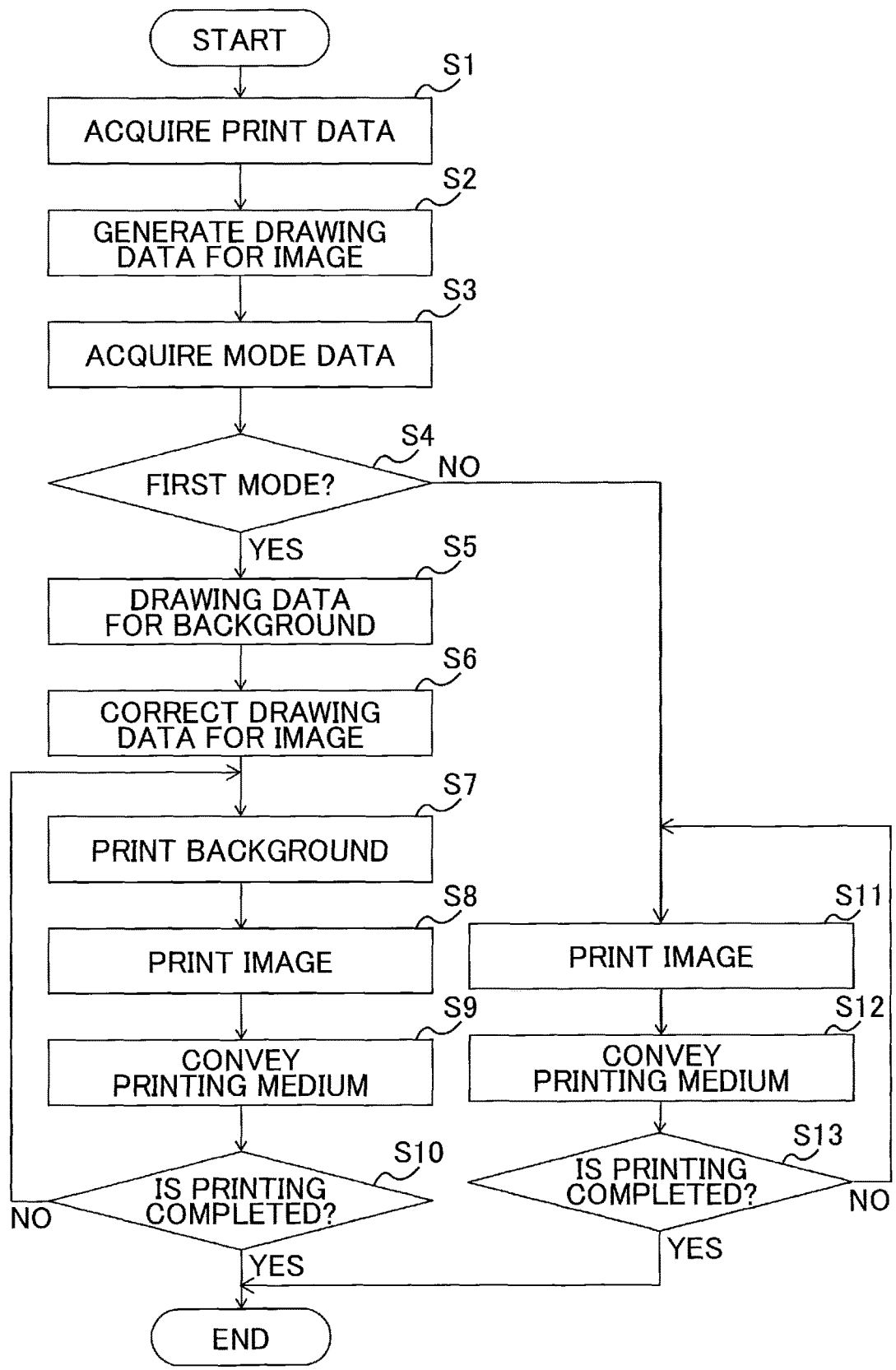
FIG. 7 is a flowchart illustrating a control method of the printing apparatus.

The controller 60 executes a control method of the printing apparatus 10 according to the flowchart in FIG. 7, for example. In S1 at the beginning of the control method, the controller 60 acquires print data. In S2 the controller 60 performs a color conversion process and a halftone process on the image data included in the print data to generate drawing data for the image. In S3 the controller 60 acquires mode data from an input device or the like, and in S4 determines based on the mode data whether the printing process is to be executed in the first mode.

In a case that the mode data indicates the first mode (S4: YES), in S5 the controller 60 generates drawing data for the background. In S6 the controller 60 corrects the drawing data for the image that was generated in S2 so that the ejection quantity of second type of liquid when printing an image (printing an image based on image data) in the first mode is greater than the ejection quantity of the second type of liquid when printing the same image (printing an image based on the same image data) in the second mode.

In S7 the controller 60 executes a background pass based on the drawing data for the background generated in S5 to print the background E on the printing medium A. Next, in S8 the controller 60 executes an image pass based on the drawing data for the image corrected in S6 to print the image C on the background E. In S9 the controller 60 executes a conveyance operation to convey the printing medium A forward. In S10 the controller 60 determines whether all passes in the print data have been completed. In a case that all passes have not been completed (S10: NO), the controller 60 returns to S7 and executes the next pass. However, in a case that all passes in the print data have been completed (S10: YES), the controller 60 ends the printing process.

On the other hand, in a case that the mode data indicates the second mode (S4: NO), in S11 the controller 60 executes a pass based on drawing data for the image that was generated in S2 to print the image C on the printing medium A. In S12 the controller 60 executes a conveyance operation to convey the printing medium A forward. In a case that all passes in the print data have not been completed (S13: NO), the controller 60 returns to S11 to execute the next pass. However, in a case that all passes in the print data have been completed (S13: YES), the controller 60 ends the printing process.

In this way, the printing apparatus 10 increases the ejection quantity of the second type of liquid when printing an image in the first mode to a quantity larger than the ejection quantity of the second type of liquid when printing the same image in the second mode. Accordingly, although the second type of liquid does not spread easily over a background, increasing the ejection quantity of the second type of liquid in such cases can reduce color irregularities and banding that can occur and suppress a drop in image quality especially in areas printed with overlapping colors using the second type of liquid.

Additionally, the ejection quantities of chromatic ink are set greater when printing an image in the first mode than when printing the same image in the second mode. For example, a single dot Dk formed in black ink is replaced with three dots Dc, Dy, and Dm formed with chromatic ink.

Since the dots Dc, Dy, and Dm formed with chromatic ink for producing black color have a greater area than the dot Dk, a drop in image quality can be suppressed in areas printed with overlapping colors.

Second Embodiment

In the printing apparatus 10 according to a second embodiment, the controller 60 controls the ejection quantity of the second type of liquid to modify the size of target dots. The targets dots are at least some of the dots constituting an image. The controller 60 controls the ejection quantity of the second type of liquid so that the size of the target dots in the first mode is greater than the size of corresponding dots in the same image (an image based on the same image data) formed in the second mode.

Specifically, in S2 of FIG. 7 the controller 60 sets gradations in the drawing data based on the sizes of the dots to be formed with liquid ejected from the nozzles 21. Each gradation is data specifying one of four levels: "no dot" in which liquid is not ejected from the nozzle 21, "small dot" formed with less liquid than a prescribed quantity, "medium dot" formed with the prescribed quantity of liquid, and "large dot" formed with more liquid than the prescribed quantity. In the halftone process, the controller 60 converts the pixel data representing a range of 256 gradations to drawing data having four gradations to generate drawing data for the image.

In the second mode, in S11 of FIG. 7 the controller 60 prints an image C based on the drawing data for the image. Here, the controller 60 generates waveform selection data for small dots in order to eject a quantity of liquid smaller than the prescribed quantity, generates waveform selection data for medium dots in order to eject liquid of the prescribed quantity, and generates waveform selection data for large dots in order to eject a quantity of liquid greater than the prescribed quantity. The controller 60 drives the drive elements 25 based on this waveform selection data so that the nozzles 21 corresponding to these drive elements 25 eject liquid of quantities conforming to their dot sizes.

Figure 8A:
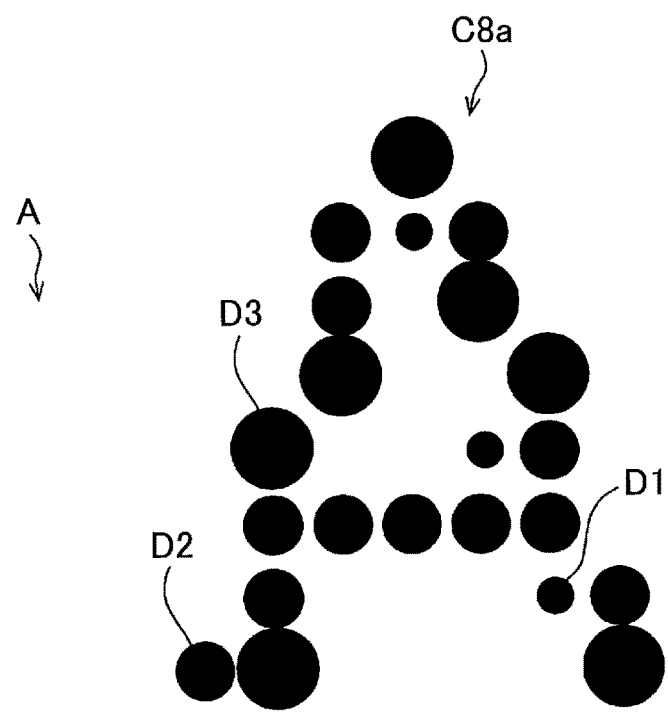
FIG. 8A is an explanatory diagram illustrating an image formed in the second mode.

Through this process, small dots D1, medium dots D2, and large dots D3 are formed on the printing medium A with the second type of liquid based on the drawing data for the image, as illustrated in FIG. 8A. Once ejected, the second type of liquid spreads over the printing medium A. Subsequently, energy is applied to the second type of liquid on the printing medium A by light emitted from the energy applying device 30 to fix the dots to the printing medium A. By repeating this process, an image C8a configured of a plurality of dots is printed directly on the printing medium A.

In the first mode, on the other hand, the controller 60 corrects the drawing data for the image in S6 of FIG. 7. In this correction process, the controller 60 corrects the gradations in drawing data for the image to increase the size of target dots. Here, the target dots are small dots and medium dots. Accordingly, all small dots in the image are corrected to medium dots, and all medium dots are corrected to large dots. It is also possible to set just a portion of the small dots and medium dots in the image as target dots and to perform correction to increase the sizes of those target dots and remaining portion of the small dots and medium dots are not converted. Further, the small dots may be corrected to large dots rather than medium dots.

Figure 8B:
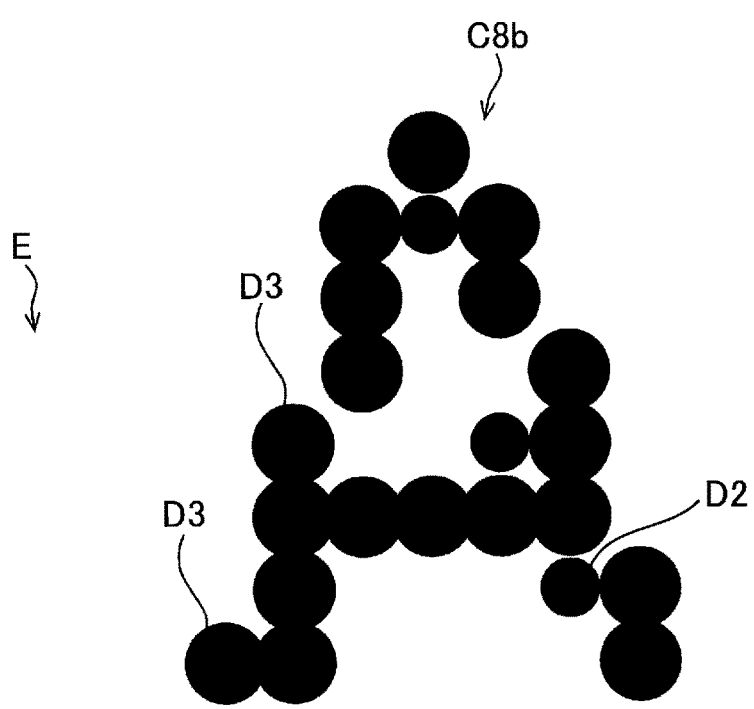
FIG. 8B is an explanatory diagram illustrating an image formed in the first mode.

Accordingly, in S8 of FIG. 7 the controller 60 executes an image pass based on the corrected drawing data for the image. As shown in FIG. 8B, the head 20 ejects second type of liquid of quantities corresponding to the drawing data to form dots D2 and D3 on the background E with the second type of liquid, thereby printing an image C8b configured of a plurality of dots on the background E.

Thus, target dots arranged at the same positions in the images C8a and C8b are printed as small dots D1 in the second mode but as medium dots D2 in the first mode. Further other target dots arranged at the same positions in the images C8a and C8b are printed as medium dots D2 in the second mode but as large dots D3 in the first mode. Consequently, the percentage of larger dots D2 and D3 among the pluralities of dots constituting the images C8a and C8b is greater in the first mode than in the second mode. Accordingly, although the second type of liquid does not spread easily over the background E, the ejection quantity of the second type of liquid is greater for forming the image C8b, thereby suppressing a drop in image quality in areas printed with overlapping colors.

First Variation

In the second embodiment described above, when printing characters (or texts) in the first mode for example, the controller 60 increases the size of target dots to a size larger than the corresponding dots formed in the second mode. In the printing apparatus 10 according to a first variation, the controller 60 controls ejection quantities of the second type of liquid so that the sizes of target dots arranged on edges of the image are not larger when printing an image of a character (text) in the first mode than the sizes of the corresponding dots formed in the second mode, but so that the sizes of only those target dots not arranged on edges of the image are larger in the first mode than the sizes of corresponding dots formed in the second mode.

Figure 9A:
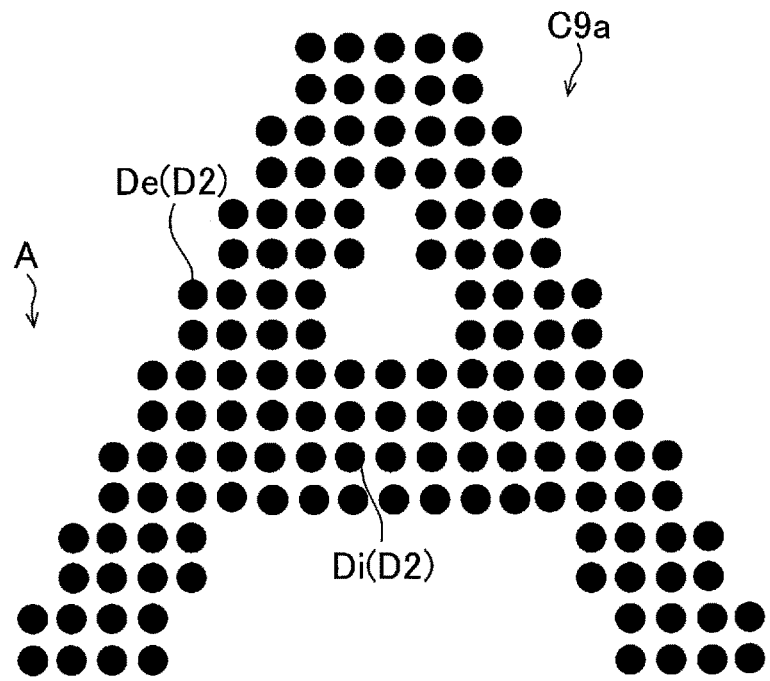
FIG. 9A is an explanatory diagram illustrating an image formed in the second mode.

FIG. 9A shows an example of an image C9a of a character configured of a plurality of medium dots D2 that was printed in the second mode based on the print data. When printing the image C9a in the first mode based on this image data, the controller 60 corrects drawing data for the image in S6 of FIG. 7. In this correction process, the controller 60 sets all medium dots D2 constituting the image C9a as target dots, for example. Next, the controller 60 examines all eight pixels surrounding each target dot to determine whether any of the surrounding pixels has the value "no dot." Each dot having at least one surrounding pixel with the value "no dot" is determined to be an edge dot De arranged on an edge of the image C9a. Edge dots De arranged on edges of the image C9a do not neighbor another dot in at least one of the front-rear, left-right, and diagonal directions.

Figure 9B:
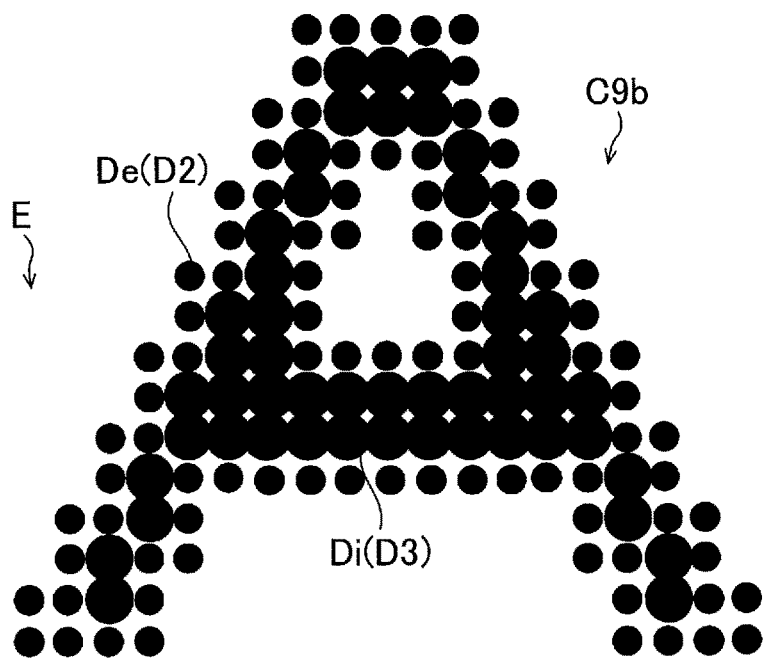
FIG. 9B is an explanatory diagram illustrating an image formed in the first mode.

FIG. 9B shows an image C9b produced by correcting gradations in drawing data for the image C9a in order to increase the size of all target dots other than edge dots De arranged on the edges of the image C9b. All target dots other than the edge dots De will be called interior dots Di. Hence, the controller 60 does not correct gradations for target dots identified as edge dots De. In this way, the controller 60 maintains the size of the edge dots De at medium dots D2 while increasing the size of interior dots Di positioned inside the edge dots De in the image C9b from medium dots D2 to large dots D3.

In S8 of FIG. 7, the controller 60 executes an image pass based on the corrected drawing data for the image. Through this pass, the controller 60 forms dots D2 and D3 on the background E with the second type of liquid for printing the image C9b shown in FIG. 9B and configured of the pluralities of dots D2 and D3 on the background E.

Thus, interior dots Di in the image C9b are printed at a larger size. By increasing the ejection quantity of the second type of liquid for forming the image C9b, the controller 60 can suppress a drop in image quality in areas printed with overlapping colors, even though the second type of liquid does not spread easily over the background E. At the same time, by correcting gradations so as not to increase the size of edge dots De along the edges of the image C9b, the controller 60 can suppress an increase in size of the overall image C9b.

Note that the controller 60 may also correct gradations in drawing data for the image so as to reduce the size of target dots corresponding to edge dots De arranged on the edges of the image C9b. Through this correction, the controller 60 reduces the size of edge dots De along the edges of the image C9b from medium dots D2 to small dots D1. Accordingly, by correcting gradation values so as to reduce the size of edge dots De in the image C9b, the controller 60 can suppress an increase in the size of the image C9b.

Third Embodiment

In the printing apparatus 10 according to a third embodiment, the controller 60 controls ejection quantities of the second type of liquid by setting the maximum dot size for a plurality of dots configuring an image (an image based on image data) in the first mode greater than the maximum dot size for a plurality of dots configuring the same image (an image based on the same image data) in the second mode.

Specifically, in S2 of FIG. 7, the controller 60 sets gradations in the drawing data based on the sizes of dots formed with liquid ejected from the nozzles 21. For example, each gradation may be data specifying one of four levels: "no dot," "small dot," "medium dot," and "large dot." Through the halftone process, the controller 60 generates drawing data for an image by converting pixel data specifying values within a range of 256 gradations to drawing data specifying values within a range of four gradations.

In S11 of FIG. 7, the second type of liquid is ejected from the head 20 based on this image drawing data. Thus, when printing an image in the second mode in S11, as illustrated in FIG. 8A medium dots D2 and large dots D3 are formed on the printing medium A with the second type of liquid. With these dots, the controller 60 prints the image C8a on the printing medium A.

In the first mode, on the other hand, the controller 60 corrects this drawing data for the image in S6 of FIG. 7. In the correction process, the controller 60 sets the largest dots among small, medium, and large dots configuring the image as target dots based on gradations in the image drawing data. Next, the controller 60 sets the ejection quantity of second type of liquid for forming the target dots to a quantity greater than the ejection quantity of second type of liquid used to form the large dots D3 by increasing the ejection quantity to a quantity less than or equal to the maximum quantity the head 20 can eject. In this way, the controller 60 corrects the gradations for target dots to extra-large dots D4 having a size larger than the large dots D3.

Figure 10:
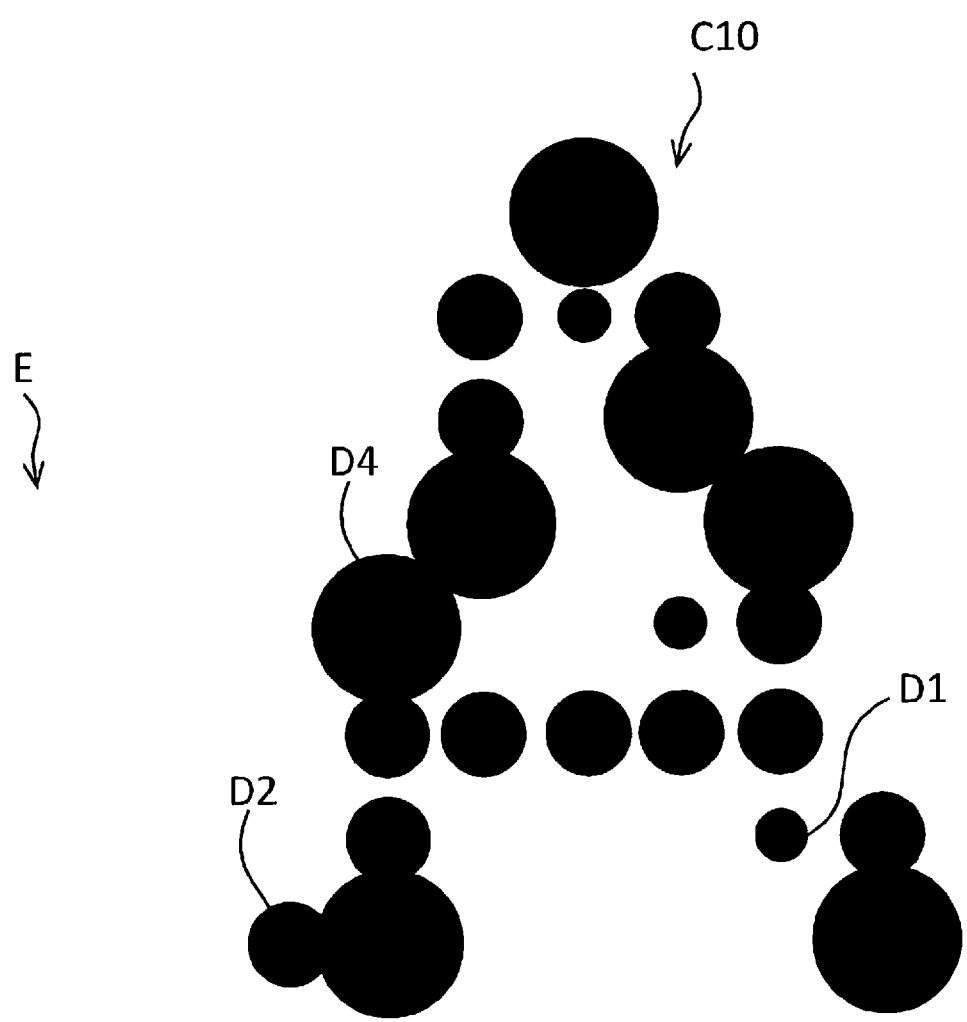
FIG. 10 is an explanatory diagram illustrating an image formed in the second mode.

In S8 of FIG. 7 the controller 60 executes an image pass based on the corrected drawing data for the image. As shown in FIG. 10, the head 20 forms extra-large dots D4 on the background E with the second type of liquid by ejecting second type of liquid of a greater quantity than the quantity used to form large dots D3, thereby printing an image C10 configured of a plurality of dots including extra-large dots D4 on the background E.

Thus, target dots arranged at the same positions in the images C8a and C10 are printed as large dots D3 in the second mode but as extra-large dots D4, which are larger than large dots D3, in the first mode. Hence, by increasing the ejection quantity of second type of liquid for forming the image C10, the controller 60 can suppress a drop in image quality in areas printed with overlapping colors, even though the second type of liquid does not spread easily over the background E.

Second Variation

When printing an image of a character (text) in the first mode, the controller 60 in the third embodiment described above increases the maximum dot size from the size used in the second mode for a plurality of dots arranged along the edges of the image as well as dots not arranged along the edges of the image. In the printing apparatus 10 according to a second variation, the controller 60 controls the ejection quantities of the second type of liquid in the first mode so as to increase the maximum dot size of dots not arranged on the edges of the image to a size greater than the maximum dot size used in the second mode while not increasing the maximum dot size of dots arranged on the edges of the image.

Figure 11A:
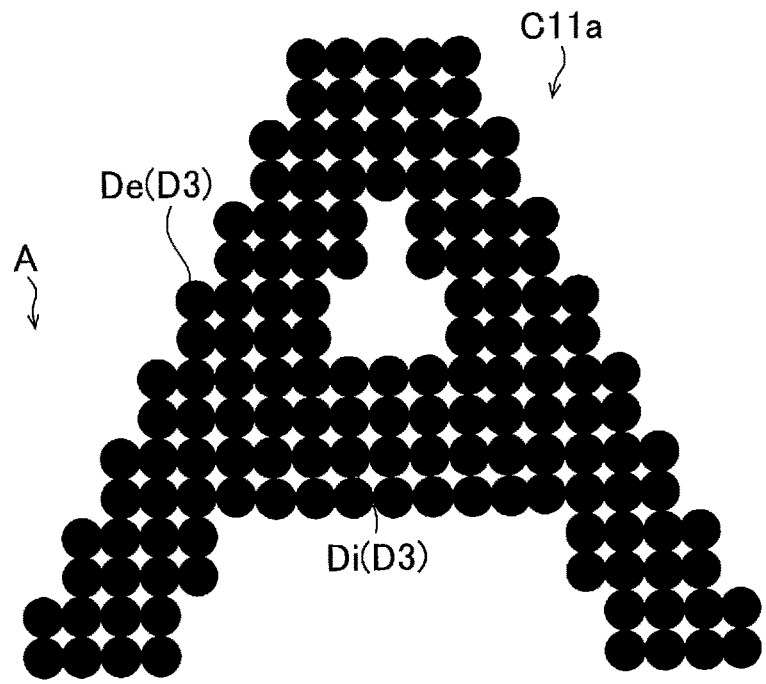
FIG. 11A is an explanatory diagram illustrating an image formed in the second mode.
Figure 11B:
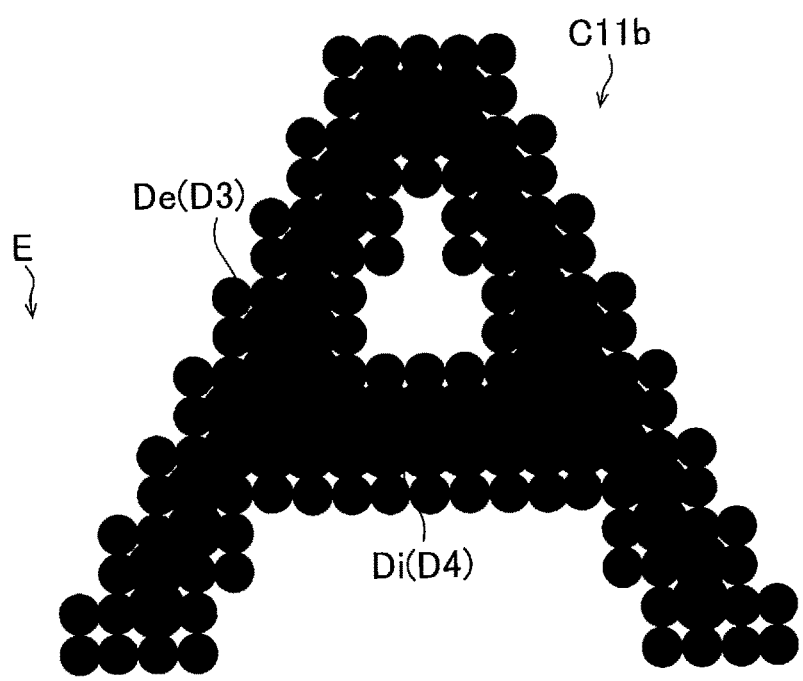
FIG. 11B is an explanatory diagram illustrating an image formed in the first mode.

In the example shown in FIG. 11A, an image C11a configured of a plurality of large dots D3 is printed in the second mode based on the print data. However, in a case that an image based on this print data is being printed in the first mode, in S6 of FIG. 7 the controller 60 sets as target dots all large dots D3 which have the largest dot size in the image C11a to correct drawing data for the image. FIG. 11B shows an image C11b based on the corrected drawing data. Here, the controller 60 examines the eight pixels surrounding each target dot based on the drawing data to identify target dots having a surrounding pixel with the value "no dot." The controller 60 determines that each dot having at least one surrounding pixel with the value "no dot" is an edge dot De arranged on the edge of the image C11b. Thus, edge dots De of the image C11b do not neighbor a dot in one of the front-rear, left-right, and diagonal directions.

Next, the controller 60 corrects gradations in the image drawing data for interior dots Di positioned inside edge dots De constituting edges of the image C11b so as to increase the ejection quantity of liquid used for forming these dots. The controller 60 does not correct gradations for edge dots De among the target dots that are arranged along edges of the image C11b. Through this process, the size of edge dots De in the image C11b is maintained at the large dots D3, while the size of interior dots Di positioned inside the edge dots De in the image is increased from large dots D3 to extra-large dots D4.

Consequently, in S8 of FIG. 7 the controller 60 executes an image pass based on the corrected drawing data for the image. As a result, dots are formed on the background E with the second type of liquid for printing the image C11b configured of a plurality of dots illustrated in FIG. 11B.

In this way, interior dots Di in the image C11b are printed at a larger size. Since the ejection quantity of the second type of liquid is greater when forming the image C11b, the controller 60 can suppress a drop in image quality in areas printed with overlapping colors, even though the second type of liquid does not spread easily over the background E. Conversely, since the edge dots De on the edges of the image C11b are not corrected to a larger size, the controller 60 can suppress an increase in the size of the image C11b.

Note that the controller 60 may correct gradations in the image drawing data in order to reduce the size of target dots, where the target dots are edge dots De arranged on the edges of the image C11b. Through this process, the controller 60 decreases the size of edge dots De in the image C11b from large dots to medium or small dots. By correcting edge dots De on the edges of the image C11b to a smaller size, the controller 60 can suppress an increase in the overall size of the image C11b.

Fourth Embodiment

In the printing apparatus 10 according to a fourth embodiment, the controller 60 controls the head 20 so that the number of ejections of second type of liquid when printing an image (printing an image based on image data) in the first mode are greater than the number of ejections of the second type of liquid when printing the same image (printing an image based on the same image data) in the second mode.

Specifically, in S2 of FIG. 7 the controller 60 sets gradations in drawing data according to the presence of dots. For example, each gradation is data specifying one of two levels: "dot" and "no dot." The controller 60 performs a halftone process to convert pixel data specifying values within a range of 256 gradations to drawing data specifying one of the two gradations, thereby generating drawing data for the image.

Figure 12A:
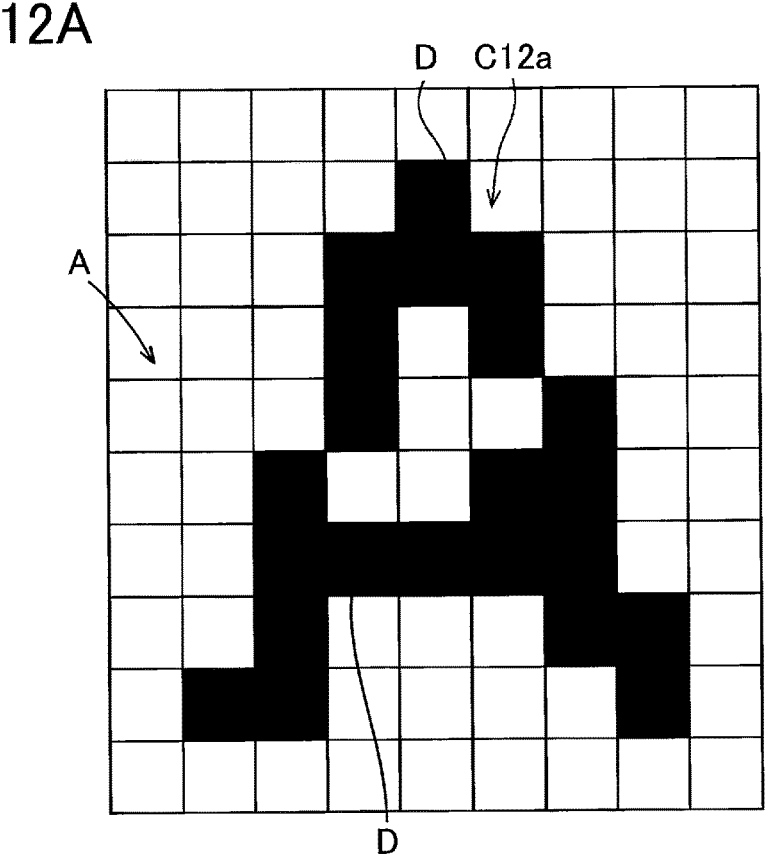
FIG. 12A is an explanatory diagram illustrating an image formed in the second mode.

When printing an image in the second mode in S11 of FIG. 7, the second type of liquid is ejected from the head 20 based on the image drawing data and dots are formed on the printing medium A with the second type of liquid, as illustrated in FIG. 12A. Subsequently, energy is applied to the second type of liquid on the printing medium A through light emitted from the energy applying device 30, thereby fixing the dots to the printing medium A. By repeatedly performing these operations, an image C12a configured of a plurality of dots is directly printed on the printing medium A.

In the first mode, on the other hand, in S6 of FIG. 7 the controller 60 corrects this drawing data for the image. In the correction process, the controller 60 corrects gradations to produce pixels with dots from pixels with no dots, thereby increasing the number of dots in the image drawing data constituting the image. For example, when correcting gradations in the drawing data, the controller 60 first identifies pixels F positioned between a pixel with no dot and a pixels with a dot in the left-right direction and between a pixel with no dot and a pixel with a dot in the front-rear direction, and replaces the "no dot" value of the pixels F with a "dot" value.

Figure 12B:
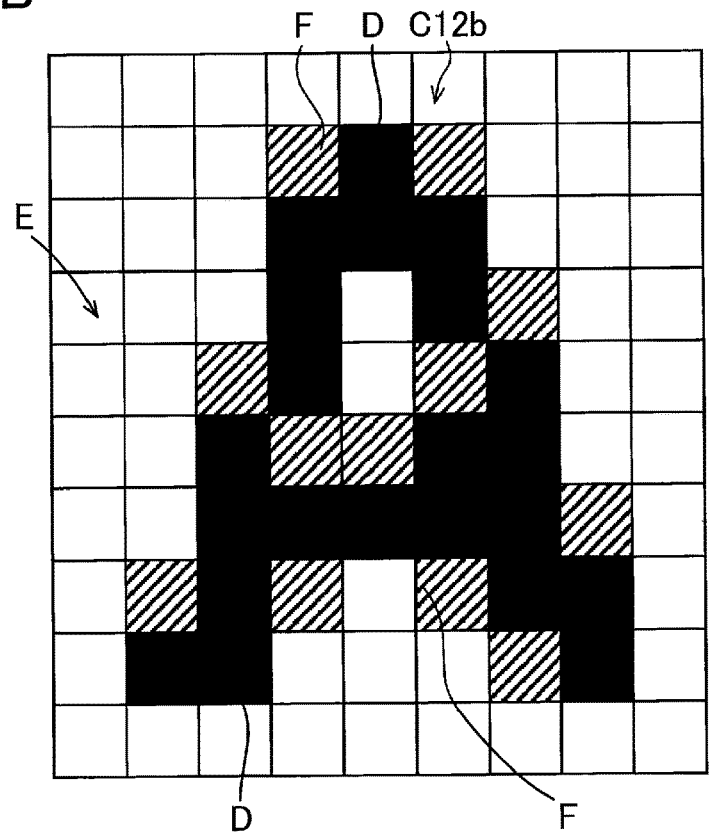
FIG. 12B is an explanatory diagram illustrating an image formed in the first mode.

After performing this correction, in S8 of FIG. 7 the controller 60 executes an image pass based on the corrected drawing data for the image. By ejecting the second type of liquid from the head 20 at pixels F, whose values were changed from "no dot" to "dot," dots D are formed on the background E with the second type of liquid, as illustrated in FIG. 12B, thereby printing an image C12b configured of a plurality of dots D on the background E. By increasing the number of dots configuring the image C12b in this way, the controller 60 increases the ejection quantity of the second type of liquid used for forming the image C12b. Accordingly, the controller 60 can suppress a drop in image quality in areas printed with overlapping colors, even though the second type of liquid does not spread easily over the background E.

Fifth Embodiment

The printing apparatus 10 according to a fifth embodiment is provided with the carriage 42 that moves in the scanning direction while supporting the head 20. Control performed by the controller 60 for printing an image on the printing medium A includes ejection control for controlling the head 20 to eject at least the second type of liquid while the carriage 42 is moved in the scanning direction. The controller 60 controls the carriage 42 and the head 20 so that the total number of times ejection control is performed in the first mode for printing an image (an image based on image data) on a printing medium A with the second type of liquid is greater than the total number of times the controller 60 performs ejection control in the second mode when printing the same image (an image based on the same image data) with the second type of liquid.

Specifically, the example of FIG. 9A shows the image C9a of a character configured of a plurality of medium dots D2 that is printed in the second mode based on the print data. When the same image (an image based on the same image data) C9a is printed in the first mode based on this print data, in S6 of FIG. 7 the controller 60 corrects the drawing data for the image. In the correction process, the controller 60 corrects the drawing data so that ejection control is performed a plurality of times during one image pass, and specifically so that the number of times ejection control is performed per image pass in the first mode is greater than that in the second mode. Here, ejection control includes an ejection operation and a scan operation. For example, the controller 60 may perform interlace printing. In interlace printing, all or part of the image formed each time ejection control is executed overlaps the images formed the other times ejection control is executed. In this case, the controller 60 performs rasterization on drawing data for the image, dividing the rasterized drawing data into passes, and subsequently corrects this drawing data so that the drawing data for each pass is assigned to a plurality of ejection control executions.

In S8 of FIG. 7, the controller 60 subsequently generates control data for the image based on the drawing data and outputs this control data to the head drive circuit 65. After completing ejection control the plurality of times for one image pass based on the drawing data for that pass, the controller 60 performs an energy application operation. Hence, while the head 20 moves leftward, the controller 60 controls the head 20 to eject the second type of liquid according to the drawing data for the current pass. Through this process, the controller 60 forms dots D2 with the second type of liquid for forming an image C13a on the background E, as illustrated in FIG. 13A.

Specifically, the controller moves the head 20 leftward while controlling the head 20 to eject second type of liquid according to the drawing data for one pass. Next, without applying energy from the energy applying device 30, the controller 60 moves the head 20 rightward. Subsequently, the controller 60 again moves the head 20 leftward while controlling the head 20 to eject second type of liquid according to the drawing data for the same pass. Through this process, additional dots D2 are formed in the second type of liquid so as to overlap the dots D2 formed in the preceding execution of ejection control. After performing ejection control a plurality of times in this way, the controller 60 controls the energy sources 31 to apply energy to the second type of liquid while the energy applying device 30 moves leftward, thereby curing the second type of liquid and fixing the second type of liquid to the background E. In other words, in the fifth embodiment, in each of the plurality of ejection controls for one pass, the second type of liquid is ejected to form the same image for the one pass (an image based on the same image data for the one-pass), and the image formed in one ejection control entirely or partially overlaps the image formed in another (previous) ejection control.

Figure 13A:
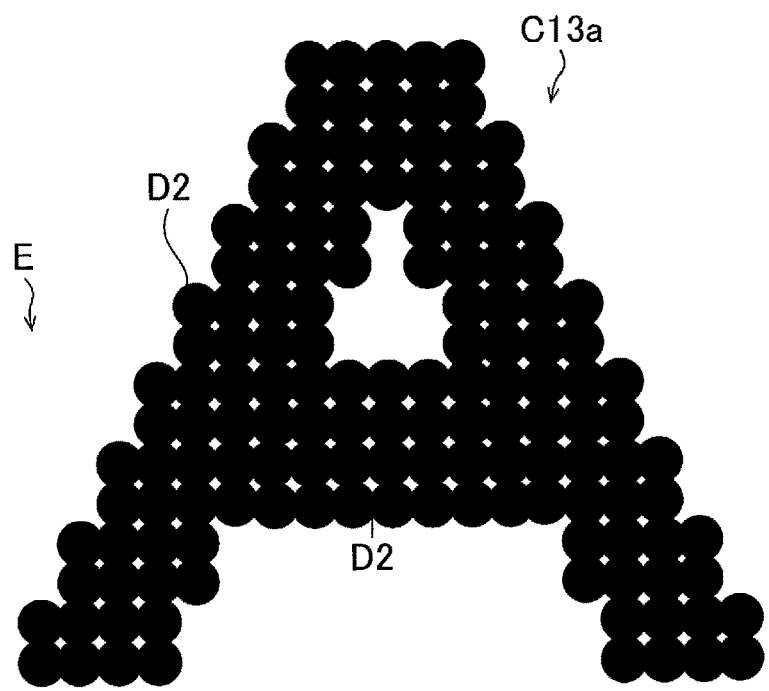
FIG. 13A is an explanatory diagram illustrating an image formed in the first mode.

By performing ejection control a plurality of times in an image pass, the controller 60 increases the number of dots D2 forming the image C13a, as illustrated in FIG. 13A. Since the ejection quantity of the second type of liquid for forming the image C13a is large, the controller 60 can suppress a drop in image quality in areas printed in overlapping colors, even though the second type of liquid does not easily spread over the background E.

As in the first mode, the controller 60 may also perform ejection control a plurality of times in the second mode for an image pass based on drawing data for the same pass. The controller 60 performs an energy application operation after completing ejection control a plurality of times for one image pass.

Figure 13B:
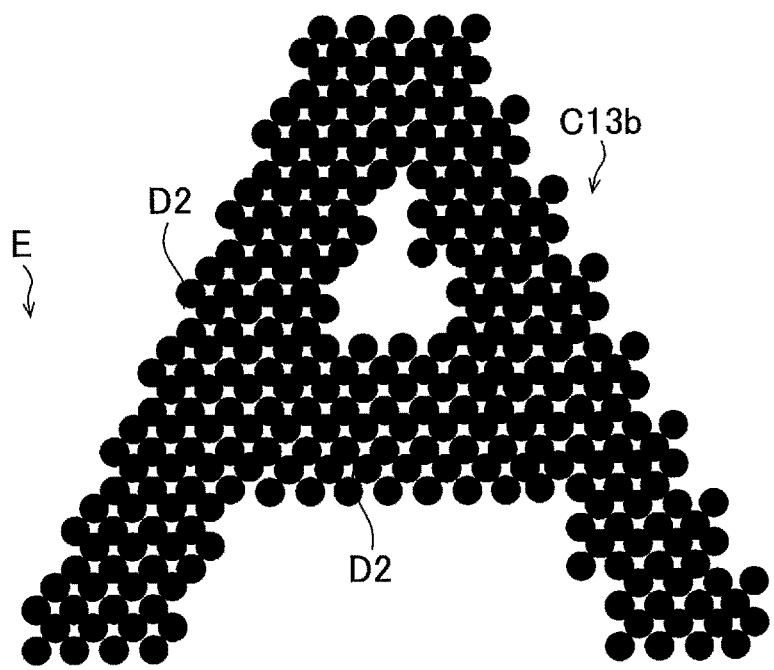
FIG. 13B is an explanatory diagram illustrating an image formed in the first mode.

Further, the controller 60 may perform ejection control a plurality of times while offsetting the positions of the dots D2 each time. FIG. 13B shows an image C13b produced according to this ejection control. In this case, the controller 60 may convey the printing medium A in the rear direction a distance shorter than the pitch between neighboring nozzles 21 in between consecutive executions of ejection control so that the dots are offset from each other with portions of the dots overlapping. The image C13b produced through this process has a higher resolution in the front-rear direction than the resolution based on the pitch of nozzles 21. Note that the positions of dots may be offset in the left-right direction by varying the nozzles 21 ejecting the second type of liquid or the timings for ejecting this second type of liquid.

Other Variations

In all of the embodiments and variations described above, the energy sources 31 in the energy applying device 30 employ light sources to generate light energy, but the present disclosure is not limited to this configuration. For example, the energy sources 31 may be radio wave generators that generate heat energy and energy from microwaves or other radio waves. In this case, the liquid employed in the printing apparatus is a liquid cured by radio waves.

The energy sources 31 of the energy applying device 30 may also employ heaters for applying heat. Some examples of heaters that may be used are radiation heaters, hot-air heaters, and contact heaters. In this case, the printing apparatus employs a liquid such as latex ink that is cured with heat. The energy sources 31 may be integrated into one heater.

In all the embodiments and variations described above, the printing apparatus 10 employs a serial head system in which the head 20 supported in the carriage 42 is moved in the left-right direction. However, the printing apparatus 10 may use a line head system in which the head 20 is stationary and the carriage 42 is omitted.

In all the embodiments and variations described above, piezoelectric elements are employed as the drive elements 25, but the present disclosure is not limited to this configuration. For example, the drive elements 25 may be configured of one of thermal actuators, such as heating resistors, that generate air bubbles; and electrostatic actuators, such as electrodes, that generate electrostatic force.

Although the printing apparatus 10 performs unidirectional printing in all the embodiments and variations described above, the printing apparatus 10 may also perform bidirectional printing. In this case, the printing apparatus 10 is provided with a pair of energy applying devices 30 arranged on opposite sides of the head 20 in the left-right direction. When the head 20 moves leftward, the right-side energy applying device 30 following the head 20 applies energy to the liquid ejected by the head 20 onto the printing medium A. When the head 20 moves rightward, the left-side energy applying device 30 following the head 20 applies energy to the liquid ejected by the head 20 onto the printing medium A.

Note that all of the above embodiments may be combined, provided that they are not mutually exclusive. Further, numerous modifications and other embodiments of the present disclosure would be apparent to those skilled in the art from the foregoing description. Therefore, the foregoing description should be interpreted only as an example and is provided for the purpose of instructing those skilled in the art of the best mode for carrying out the present disclosure. The structural and/or functional details may be substantially altered without departing from the spirit of the present disclosure.

INDUSTRIAL APPLICABILITY

The present disclosure is useful as a printing apparatus and the like capable of suppressing a drop in image quality in areas printed with overlapping colors.

What is claimed is:

1. A printing apparatus comprising:
a head configured to separately eject a first type of liquid and a second type of liquid toward a printing medium;
an energy applying device configured to cure the first type of liquid and the second type of liquid on the printing medium; and
a controller configured to set a print mode to a first mode or a second mode,
wherein, in the first mode, the head ejects the first type of liquid onto the printing medium and the energy applying device applies energy to the first type of liquid on the printing medium so that the first type of liquid is cured and fixed on the printing medium to form a background, and subsequently the head ejects the second type of liquid onto the background and the energy applying device applies energy to the second type of liquid on the background so that the second type of liquid is cured and fixed on the background and an image is formed on the background,
wherein, in the second mode, the head ejects the second type of liquid onto the printing medium without forming the background, the background being formed by ejecting the first type of liquid onto the printing medium with the head and applying energy to the first type of liquid on the printing medium with the energy applying device in the first mode, and the energy applying device applies energy to the second type of liquid on the printing medium so that the second type of liquid is cured and fixed on the printing medium and an image is formed on the printing medium,
wherein the controller is further configured to perform setting a quantity of the second type of liquid, which is to be used when the image is formed in the first mode, to be greater than a quantity of the second type of liquid to be used when the same image is formed in the second mode.

2. The printing apparatus according to claim 1, wherein the first type of liquid includes a white ink.

3. The printing apparatus according to claim 1, wherein the second type of liquid includes a chromatic ink,
wherein the controller is configured to further perform setting a quantity of the chromatic ink, which is to be used when the image is formed in the first mode, to be greater than a quantity of the chromatic ink to be used when the same image is formed in the second mode.

4. The printing apparatus according to claim 1, wherein the controller is configured to further perform:
   setting one or more target dots from among a plurality of dots configuring the image; and
   setting a size of one of the one or more target dots, which is to be formed when the image is formed in the first mode, to be greater than a size of a dot corresponding to the one of the one or more target dots to be formed when the same image is formed in the second mode.

5. The printing apparatus according to claim 4, wherein the controller is configured to further perform: when a text image is formed in the first mode,
   setting a size of each of the one or more target dots, which is to be arranged on an edge of the text image, to be no more than a size of a dot corresponding to the each of the one or more target dots to be formed when the same text image is formed in the second mode; and
   setting a size of each of the one or more target dots, which is to be arranged at a position other than an edge of the text image, to be greater than a size of a dot corresponding to the each of the one or more target dots to be formed when the same text image is formed in the second mode.

6. The printing apparatus according to claim 1, wherein the controller is configured to further perform:
   setting a maxim size of a dot from among a plurality of dots configuring the image to be formed in the first mode to be greater than a maxim size of a dot from among a plurality of dots configuring the same image to be formed in the second mode.

7. The printing apparatus according to claim 6, wherein the controller is configured to further perform: when a text image is formed in the first mode,
   setting a maxim size of dot, which is to be arranged on an edge of the text image among the plurality of dots configuring the text image, to be no more than a maxim size of dot among a plurality of dots formed when the same text image is formed in the second mode; and
   setting a maxim size of dot to be arranged at a position other than an edge of the text image to be greater than a maximum size of a dot among the plurality of dots to be formed when the same text image is formed in the second mode.

8. The printing apparatus according to claim 1, wherein the controller is configured to further perform:
   controlling the head so that number of ejections of the second type of liquid ejected when the image is formed in the first mode is greater than number of ejections of the second type of liquid when the same image is formed in the second mode.

9. The printing apparatus according to claim 1, further comprising a carriage supporting the head and being movable in a scanning direction,
   wherein the controller is configured to perform a print control to form the image on the printing medium or the background,
   wherein the print control includes an ejection control to control the head to eject the second type of liquid while controlling the carriage to move in the scanning direction,
   wherein the controller is configured to control the carriage and the head so that a total number of ejection controls performed when the image is formed by the second type of liquid in the first mode is greater than a total number of ejection controls performed when the same image is formed by the second type of liquid in the second mode.

* * * * *